G. F. JOHNSON.
Corn Sheller.
No. 81,375.
Patented Aug. 25, 1868.
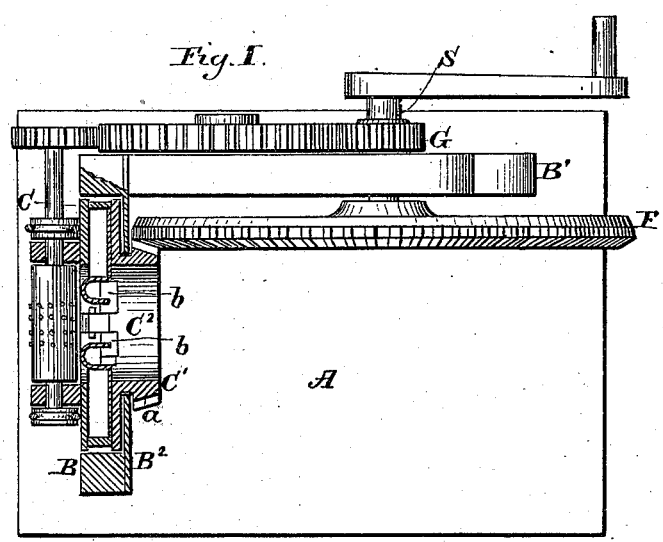
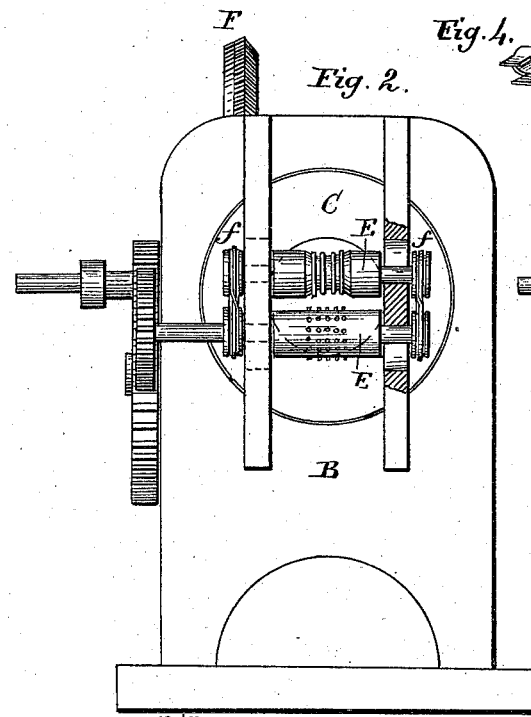  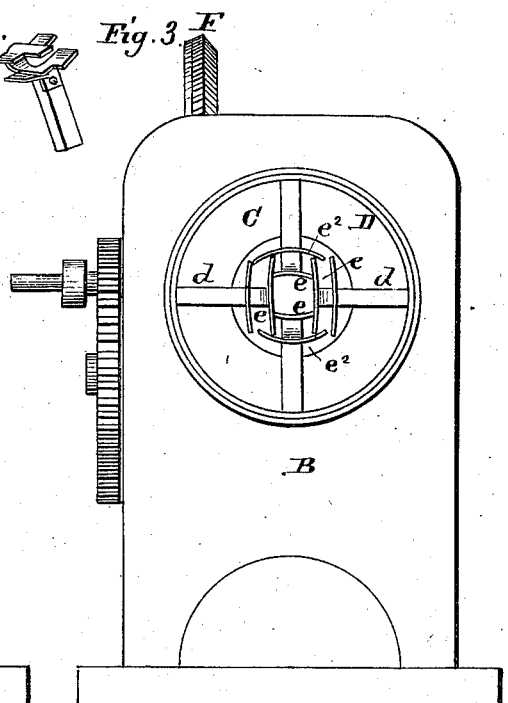
Witnesses:
W. C. Ashkettle
Wm. A. Morgan
Inventor:
G. F. Johnson
per Munn & Co.
attorneys

United States Patent Office.

GEORGE F. JOHNSON, OF MARSHALL, IOWA.

Letters Patent No. 81,375, dated August 25, 1868.

IMPROVEMENT IN CORN-SHELLER.

*The Schedule referred to in these Letters Patent and making part of the same.*

TO ALL WHOM IT MAY CONCERN:

Be it known that I, GEORGE F. JOHNSON, of Marshall, in the county of Henry, and State of Iowa, have invented a new and useful Improvement in Corn-Shelling Machine; and I do hereby declare that the following is a full, clear, and exact description thereof, which will enable others skilled in the art to make and use the same, reference being had to the accompanying drawings, forming part of this specification.

The nature of my invention relates to improvements in machines for shelling corn, whereby it is designed to provide a simple, cheap, and effective machine for that purpose; and it consists in a rotary wheel provided with a central opening, in which is provided a series of hooked shellers, having gauges which press upon the cob, to prevent the shellers from scraping the cob too deeply; the said shellers being provided, also, with radial stocks, which slide in corresponding grooves in the rotary wheel, and surrounded by a spring, which constantly bears them towards the centre of the said rotary wheel. A set of feeding-rollers is also provided for grasping the cob after a portion of corn on one end of the ear has been shelled off, and drawing it through the sheller, the whole being actuated from a hand-crank, as will be more fully described on reference to the accompanying drawings, wherein—

Figure 1 represents a plan of a portion of the machine and a horizontal section of another portion of the same.

Figure 2, an end elevation, with a part broken away, and

Figure 3 the same end elevation with the feed-rollers removed.

Figure 4 is a perspective view of one of the shelling-lips, detached.

Similar letters of reference indicate corresponding parts.

A represents a platform provided with a right-angled upright, B and $B^1$. C represents a wheel provided with a gear-rim, $C^1$, and a large central opening, $C^2$, and which is arranged to revolve in a circular opening in the upright, B, and is maintained in that position by the edge of the plate $B^2$, which takes into the annular groove $a$ in the wheel. The said wheel C is provided with four or any other suitable number of hooked shellers, $b\ b$ and $b\ b$, provided with shanks, which work in radial grooves $d$ in the said wheel C, and which are constantly borne inward towards the centre by the elastic band D. Said shellers are kept in position by means of a confining-disk, rigidly attached to the exterior face of wheel C, and moving with it.

The hooked shellers are provided with the curved plates $e\ e$ and $e^1\ e^1$, facing inward, which are pressed against the cob, after the corn has been removed, by the spring D. The plates $e\ e$ are made shorter than the plates $e^1\ e^1$, and prevent the latter from closing up towards the centre by the action of the spring beyond the point which is presumed to be the limit for the smallest cob. The plates $e\ e$ are limited in their movement towards the centre by the curved plates $e^2\ e^2$ striking against the ends of the plates $e^1\ e^1$. The plates $e^2$ also serve to centre the ear before it is taken hold of by the shellers.

E E represent a pair of feed-rollers, which receive the end of the cob as it passes through the shellers and protrudes far enough to be taken hold of by them, to draw it through and deliver it to the floor. The journals of the rollers work in slotted bearings, which allow them to separate, to agree with the various sizes of cobs, and are drawn together by elastic bands $f f$ at each end. The wheel C receives motion from the wheel F on the driving-shaft S, and the rollers E receive motion from a pinion, G, also on the driving-shaft, through suitable intermediate wheels.

In working the machine, the operator turns the crank with one hand, and with the other presents the ear, point first, to the shellers, holding it and forcing it through the shellers until a sufficient amount has been shelled, and it has been pushed through far enough for the drawing-rollers to take sufficient hold of the cob to hold it against the action of the shellers and draw it, when he lets go his hold on it and picks up another ear, and holds it in readiness to present to the shellers as soon as the former has been drawn through. As the point of an ear is presented to the shellers, the points are brought into contact with the same near the roots of the kernel, and by reason of the rotary motion of the former, act upon the ear in a manner similar to the action of a rotary saw, severing the kernels from the cob in a very expeditious manner. The plates $e\ e$ and $e^1\ e^1$ prevent the shellers from being caused to cut into the cob by reason of the inward pressure of the spring D, and also serve to centre the ear.

One roller, E, is provided with pins for drawing the cob through, and the other roller is provided with circular projecting ribs, to prevent the shellers from turning the ear around with them.

I claim as new, and desire to secure by Letters Patent—

1. The radially-expanding shellers, provided with the curved plates $e\ e$ and $e^1\ e^1$, in combination with the wheel C and spring D, substantially as and for the purpose described.

2. The arrangement, with relation to the drawing-rollers E E and shelling-wheel C, having the toothed rim $C^1$ of the drive-shaft S, main wheel F, pinion G, and connecting-gearing, as herein shown and described, upon the frame A B $B^1$, for the purpose specified.

GEO. F. JOHNSON.

Witnesses:
   S. D. COOK,
   WM. W. NOEL.